United States Patent [19]
Chang

[11] Patent Number: 5,265,181
[45] Date of Patent: Nov. 23, 1993

[54] OPTICAL FIBER CONNECTOR WITH EASY CHANGEABLE VERIFICATION ELEMENT

[75] Inventor: Peter Chang, Mountain View, Calif.
[73] Assignee: Foxconn International, Inc., Sunnyvale, Calif.
[21] Appl. No.: 953,899
[22] Filed: Sep. 30, 1992
[51] Int. Cl.$^5$ .............................. G02B 6/38; G02B 6/26
[52] U.S. Cl. ........................................ 385/75; 385/60; 385/53; 385/76; 385/139
[58] Field of Search .................... 385/70, 72, 73, 75, 385/76, 77, 78, 60, 66, 52, 27, 28, 29, 53, 139; 439/681

[56] References Cited

U.S. PATENT DOCUMENTS

| | | |
|---|---|---|
| 4,832,625 | 5/1989 | Puerner ............................ 439/681 |
| 4,979,792 | 12/1990 | Weber et al. .................. 385/53 X |
| 4,986,769 | 1/1991 | Adams, III et al. ............. 439/681 |
| 5,041,025 | 8/1991 | Haitmanek ...................... 439/681 |
| 5,166,995 | 11/1992 | Briggs et al. ................. 385/60 X |
| 5,167,542 | 12/1992 | Haitmanek ...................... 439/681 |

*Primary Examiner*—Brian Healy

[57] ABSTRACT

An optical fiber connector assembly (10) comprises an insulating housing (100) formed from two complementary upper cover (101) and lower base (102) suitably locked together to form the hollow housing (100). Within the housing (100) is formed at least one ferrule-receiving trough (103) adapted to receive a ferrule (400) for securing an optical fiber cable to the housing (100). Formed in the housing (100) is a passageway (105) for receiving a hollow retention bolt (200) through which the optical fiber cable enters the housing (100). A multifaceted mode-marking key element (300) is provided independently nested with an interference fit in an appropriate recess, i.e. cavities (104, 104'), within the housing (100) between the cover (101) and the base (102). The key element (300) is of a parallelepiped form having four different structural surfaces (A, B, M, S) which surround a horizontal axis which is perpendicular to the rest two side surfaces (301). These four different surfaces (A, B, M, S) define four different keyways (311, 312, 313, -) to accommodate four different key projections of other four receptacle connectors under the condition of one-to-one at a time.

11 Claims, 5 Drawing Sheets

OPTICAL FIBER CONNECTOR WITH EASY CHANGEABLE VERIFICATION ELEMENT

BACKGROUND OF THE INVENTION

1. Field of the Invention

The present invention relates to optical fiber connector assembly, and particularly to an optical fiber connector with simplified assembly mechanism having an improved mode marking feature.

2. Description of the Prior Art

As described in U.S. Pat. No. 4,979,792 to Weber et al., the optical fiber plug connector which meets the requirements of Fiber Distributed Data Interface (FDDI) standard, is required to be adapted with interchangeable keying elements which are different from one another to individually and detectably mate with the different corresponding projections in different type receptacle connectors for accommodating the different users needs. In Weber, means applied to the connector for keeping the keying elements with the connector assembly while they are not being used in the passage, is taught to prevent missing of the plural keying elements due to inadvertent misplacing of the key elements.

Referring to Abstract of U.S. Pat. No. 5,041,025 to Haitmanek, a multi-positionable key element, in place of the plural key elements used before, is positionable in plural different orientations to provide keyways each of which uniquely accommodate one of the key projections defining the plural different key positions of the receptacle connector wherein rotative movement of the key element within the plug connector provides the plural different orientations and thereby the plural keyways.

The multi-positionable key element disclosed in Haitmanek still has some disadvantages. First, because the key element is attached to the connector housing by the engagement of an internal threaded aperture with a threaded screw, the user needs to fasten or loosen the key element by a screw driver when changing the operative surfaces of the key element. Sometimes, an appropriate driver may not be easily obtained during timely switching operation, so it delays the operation and frustrates the operator.

Second, in the second from the last paragraph of Haitmanek, the housing can not be assembled together without use of the securement screw and the key element therein so that during the operative surface change of the key element, the securement and the whole character of the connector assembly is effected until the key element is again fixedly attached to the housing by the screw. Some of the internal elements of the connector assembly may move to improper positions when the connector assembly is in a non-assembled condition during changing the operative surfaces of the key element, and it will influence the accurate and strict relationship among the assembled elements in the re-assembled whole connector assembly.

Third, the key element in Haitmanek uses a T-shaped structure incorporating the complementary configuration in the housing to define four different keyways by means of three different rotation positions about the vertical axis through which the screw extends and one upside-down position by rotation about a horizontal axis. This multi-direction of rotation about different axes tends to confuse the user and complicate the switching operation. Additionally, the single T-shaped configuration surface of the key element is designedly utilized to define three separate keyways by rotation about a vertical axis, and is symmetric itself, so that the user can not easily and understandably exactly know how to rotatively reposition the key element to obtain its designated positions engaging the corresponding different key projections of the complementary receptacle connectors when there is no visible mark to indicate the rotation or positioning of the key element.

Therefore, it is desirable to provide a connector assembly having a single key which provides not only plural mutually exclusive key positions, but also the functions of independent enclosure within the housing for not effecting the whole securement of the connector assembly during the operative surface change of the key, of easy switching the operative surfaces of the key element, and of easily understandable way to show how to position the key element in its desired positions to meet the corresponding key projections of the receptacle connectors.

SUMMARY OF THE INVENTION

In terms of broad inclusions, the optical fiber connector assembly of the invention comprises an insulating housing formed from two complementary upper cover and lower base members suitably locked together to form the hollow housing. Within the housing is formed at least one ferrule-receiving trough adapted to receive a ferrule for securing an optical fiber cable to the housing. The ferrule is pre-assemblable in an appropriate receiving trough within the housing. Also formed in the housing is a passageway for receiving a hollow retention bolt through which the optical fiber cable enters the housing. A multi-faceted mode-marking key mechanism or element is provided independently nested in an interference fit in an appropriate cavity formed within the housing between the upper cover member and the lower base member. The key element is of a parallelepiped form having four different structural surfaces which surround a horizontal axis perpendicular to the rest two side surfaces. These four different surfaces define four different keyways to accommodate four different key projections of other four receptacle connectors under the condition of one-to-one at each time.

DETAILED DESCRIPTION OF THE PREFERRED EMBODIMENT

The present invention comprises a novel device which permits easily rotary repositioning of a single multi-faceted mode-marking key within a connector housing. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and the scope of the invention. Thus, the present invention is not intended to be limited to the embodiments shown, but is to be accorded with the widest scope consistent with the principles and features disclosed herein.

Figure 1:
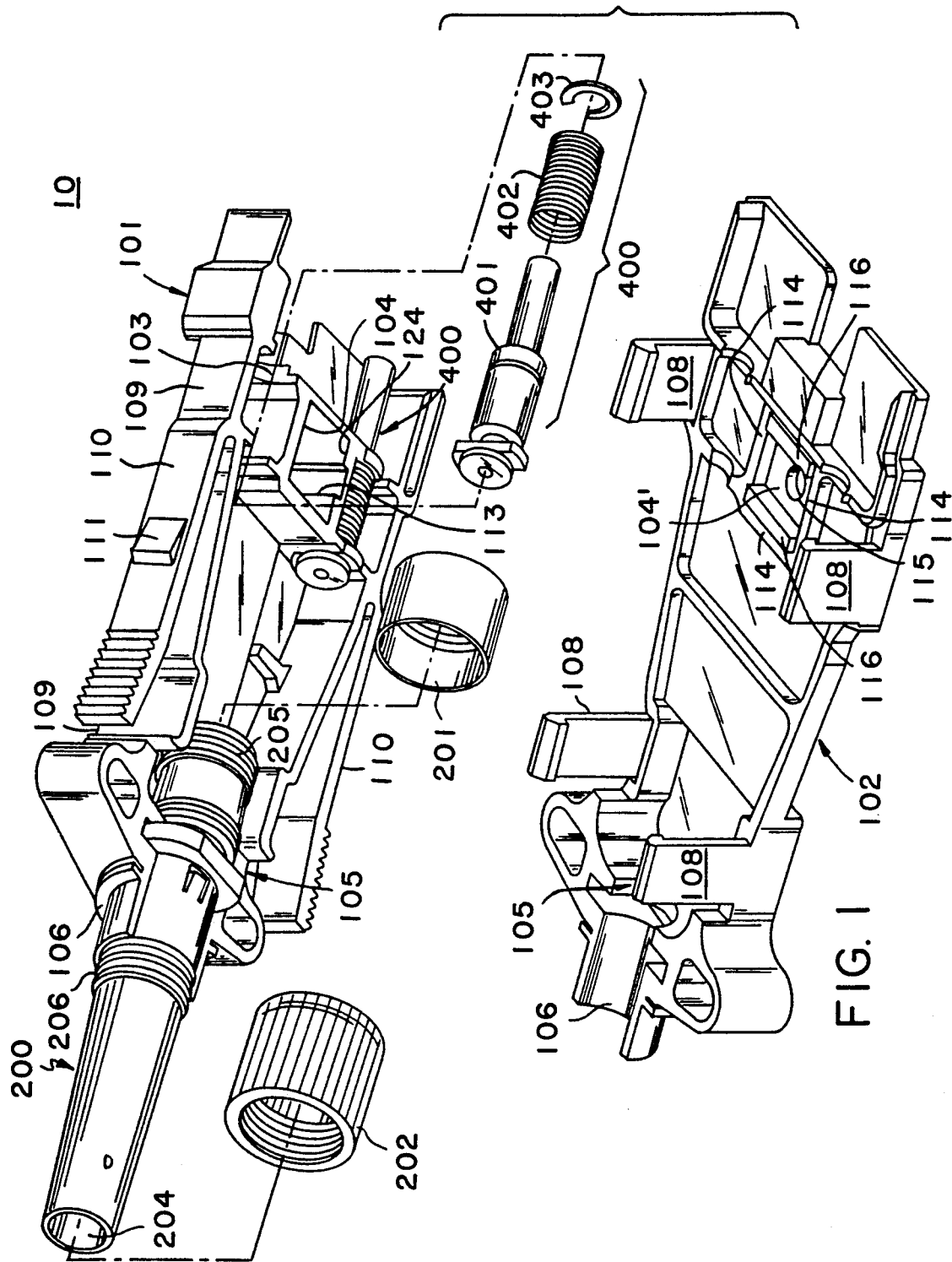
FIG. 1 is an exploded perspective view of an optical fiber connector assembly without the key element according to the present invention.

It will be noted here that for a better understanding, like components are designated by like reference numerals throughout the various figures. FIG. 1 shows an optical fiber connector assembly 10 of which some primary components are disclosed in the co-pending application Ser. No. 811,569 filed Dec. 20, 1992, pending, with the same assignee.

Figure 2:
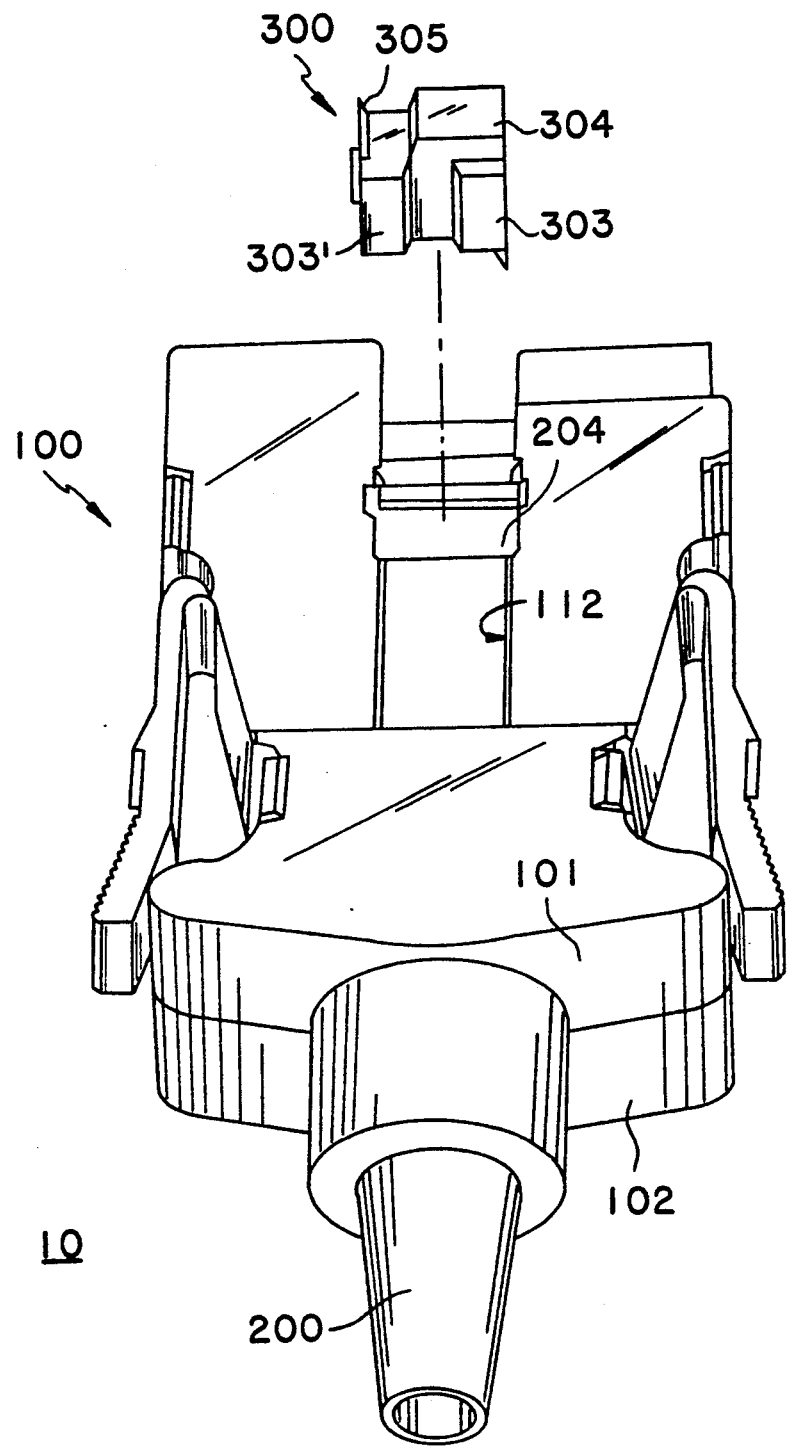
FIG. 2 perspective view of the assembled optical fiber connector assembly of FIG. 1 with a separate key element to show the structural relation between the key element and the housing of the connector assembly.

The insulating housing designated generally by the numeral 100 as indicated in FIG. 2, is formed by complementary upper cover 101 and lower or bottom base 102 with at least one and preferably two ferrule receiving troughs 103 disposed parallel to the longitudinal axis at the free end of the housing 100. At least one ferrule 400 is provided to secure and optical fiber, and is preloaded at the aforementioned ferrule receiving trough 103.

Figure 3:
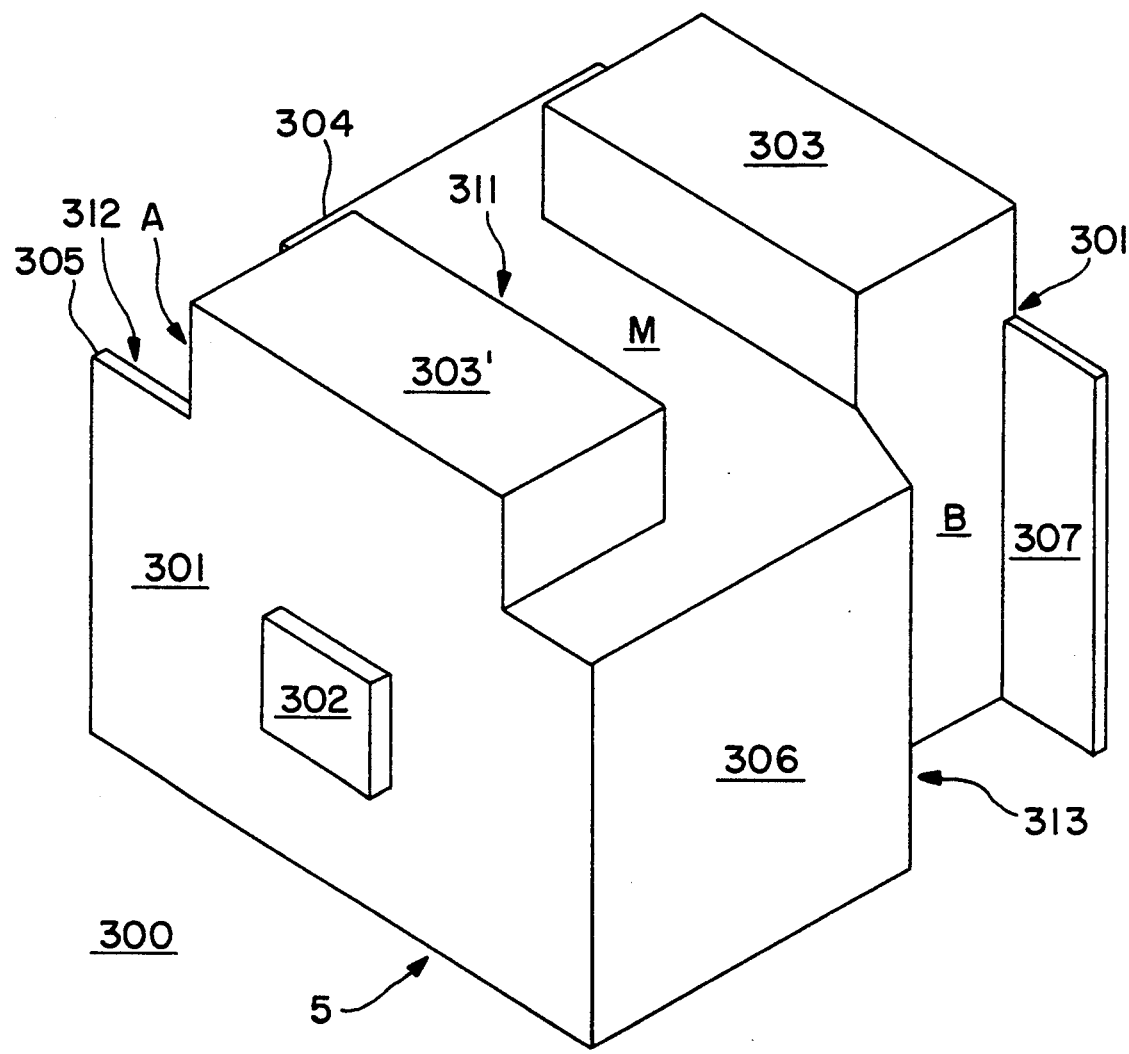
FIG. 3 is a top perspective view of the key element of FIG. 2.

An upper mode-marking key-receiving cavity 104 is formed in the upper cover 101 and cooperates with a lower aligned mode-marking key-receiving cavity 104' formed in the bottom base 102 of the aforementioned insulating housing 100 as shown. A multi-faceted key element 300 shown in FIGS. 2 and 3 provides mode-marking capability by inserting the key element 300 into the aforementioned receiving cavity 104 of the upper cover 101 as shown with the mode-designating side facing up. The structure and the configuration of the multi-faceted mode-marking key element 300 and the corresponding cavities 104, 104' of the cover 101 and the base 102, which is the main feature of the present invention, will be later illustrated below in detail.

There is also formed in the housing a passageway 105 formed concentrically along the longitudinal axis of the housing 100 at the rear end of the bottom base 102 and its corresponding upper cover 101 to receive a set of optical fiber cable retention means. The retention means includes one tubular retention bolt 200, a first thrust nut 201 and a second nut 202. As shown, the tubular retention bolt 200 is bored to define a passageway 204 and is threaded externally to provide a first threaded surface 205 and a second threaded surface 206 spaced axially from the first threaded surface 205. The retention bolt 200 is securely disposed at a proper position within the passageway 105 of the housing 100 under the situation that the first thrust nut 201 is turned onto the first end portion of the retention bolt 200 that has the first threaded surface 205 thereon, and the second thrust nut 202 is turned onto the second threaded surface 206 of the retention bolt 200 wherein semi-circular flanges 106 of the housing 100 are sandwiched between the second thrust nut 202 and the retention bolt 200.

An optical fiber cable (not shown) is adapted to extend through the passageway 204 of the retention bolt 200 and to be fastened thereto by the securement of the first and the second thrust nuts 201, 202 with the housing 100.

Ferrule assembly 400 including a body portion 401, a spring 402 and a retaining ring 403 to be assembled together, is positioned within the trough 103 for receiving a thinner optical fiber (not shown) of the aforementioned optical fiber cable therein.

The bottom base 102 has four latches 108 integrally upwardly extending therefrom and the cover 101 has four corresponding recesses 109 formed on the upper surface thereof, so that the cover 101 and the base 102 can be fixedly combined together to form the whole housing 100 by the engagement of these sets of latches 108 and detents 109. To latchably mate with a complementary receptacle connector (not shown), the housing 100 further comprises a pair of lateral deflectable latching arms 110 each including a latching lug 111 thereon.

Also referring to FIG. 2, there is a key projection channel 112 formed on the top surface of the cover 101 and communicating with the cavity 104 for receiving a corresponding key projection of the complementary receptacle connector (not shown). In this embodiment of the present invention, the cavity 104 of the cover 101 extends therethrough. Thus, the key element 300 can be easily loaded from the top and be operatively orientated within the communicating cavity 104' of the bottom base 102. A shallow groove 113 is provided in one wall 124 facing the cavity 104 of the cover 101 for the polarization of the key element 300. The cavity 104' of the base 102 is formed by four surrounding ribs 114 projecting upwardly therefrom. A tiny pin aperture 115 vertically extends through the base 102 in communication with the cavity 104'. A pair of engagement bars 116 lies on opposite sides of the cavity 104' for engagement with the corresponding portions of the key element 300.

FIG. 3 shows the key element 300 used in this embodiment of the present invention. The key element 300 has generally a parallelepiped shape defining two side planes 301 of which one has a polarization section 302 for reception within the shallow groove 113 of the cover 101 for polarization of the key element 300.

The rest four planes function as orientation planes including a plane M having a pair of parallel raising blocks 303, 303' on two opposite sides and a center keyway 311 formed therebetween. Opposite to the plane M is a plane S having no protrusion thereon.

A plane A laterally and vertically extends between one side of the plane M and the corresponding side of the plane S. A large raising block 304 is formed on the right side of the plane A and the left edge of the block 304 is generally aligned with the right edge of the left block 303' on the plane M. A thin blade 305 integrally extends from an edge of the plane A opposite to the block 304 so a keyway 312 is formed therebetween and generally aligned with the left block 303' on the plane M.

Opposite to the plane A, a plane B is vertically disposed between the plane M and the plane S. Contrary to the plane A, a large block 306 is formed on the left side of the plane B and the right edge of the block 306 is generally aligned with the left edge of the right block 303 on the plane M. Opposite to the block 306, a thin blade 307 integrally extends from an edge of the plane B so that a keyway 313 is formed therebetween and generally aligned with the right block 303 on the plane M.

Referring to FIG. 1, when the cover 101 and the base 102 are securely assembled together, the bottom ends of the walls 124 of the cover 101 which surround the cavity 104, abut against the top ends of the walls 114 of the base 102 which form the cavity 104', so that the two opposite engagement bars 116 on two sides of the cavity 104' of the base 102 extend upwardly into and matably positioned within the cavity 104 of the cover 101. A vertical cross-sectional view of the combination of the cavities 104 and 104' is shown in FIGS. 4(A)-4(D).

The key element 300 can be loaded into the cavities 104, 104' of the assembled housing 100 from the top with the polarization by means of the engagement of the polarization section 302 positioned on the side plane 301 of the key element 300 with the groove 113 positioned in the wall 124 of the cover 101.

Figure 4A:
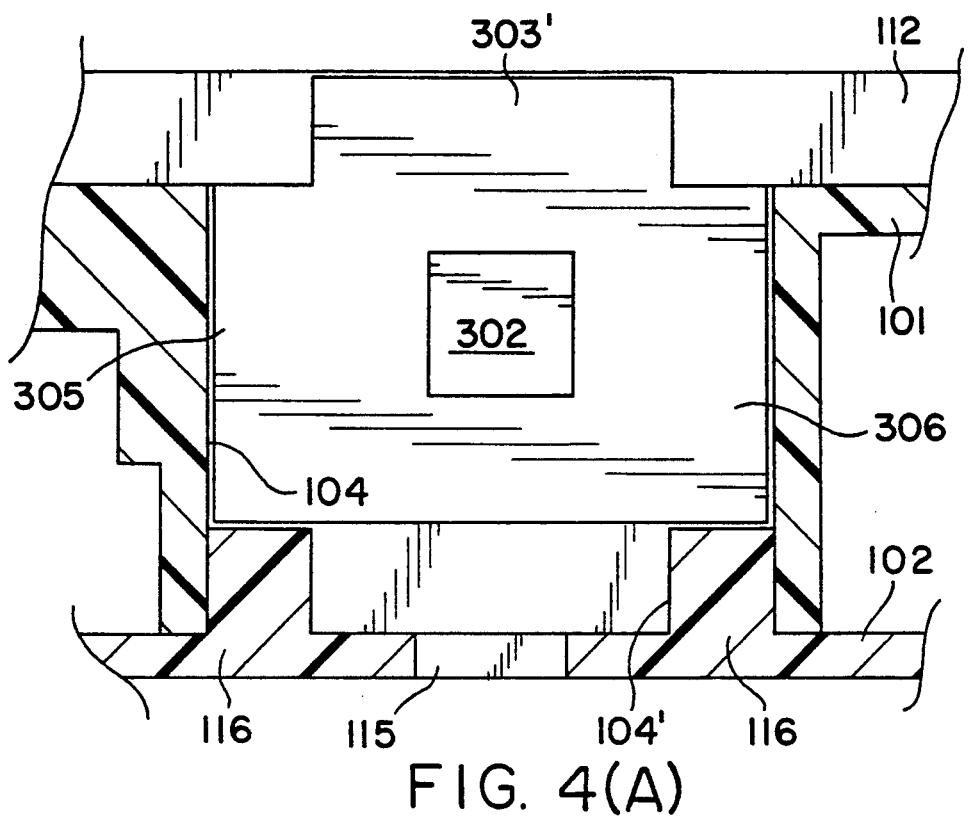
FIGS. 4(A)–4(D) are axial cross-sectional views associated with therein the key elements positioned with different orientation planes facing up to illustrate different keyways may be obtained.

Referring to FIG. 4(A), when the orientation plane M is facing up, the side portions of the block 304 and the blade 305 on the plane A and the side portions of the block 306 and the blade 307 on the plane B are respectively seated against the corresponding engagement bars 116 to support the key element 300 within the cavities 104 and 104'. Thus, the block 303 and 303' on the plane M project into the key projection channel 112 and only the keyway 311 formed therebetween allows the corresponding specific key projection to pass therethrough.

Figure 4B:
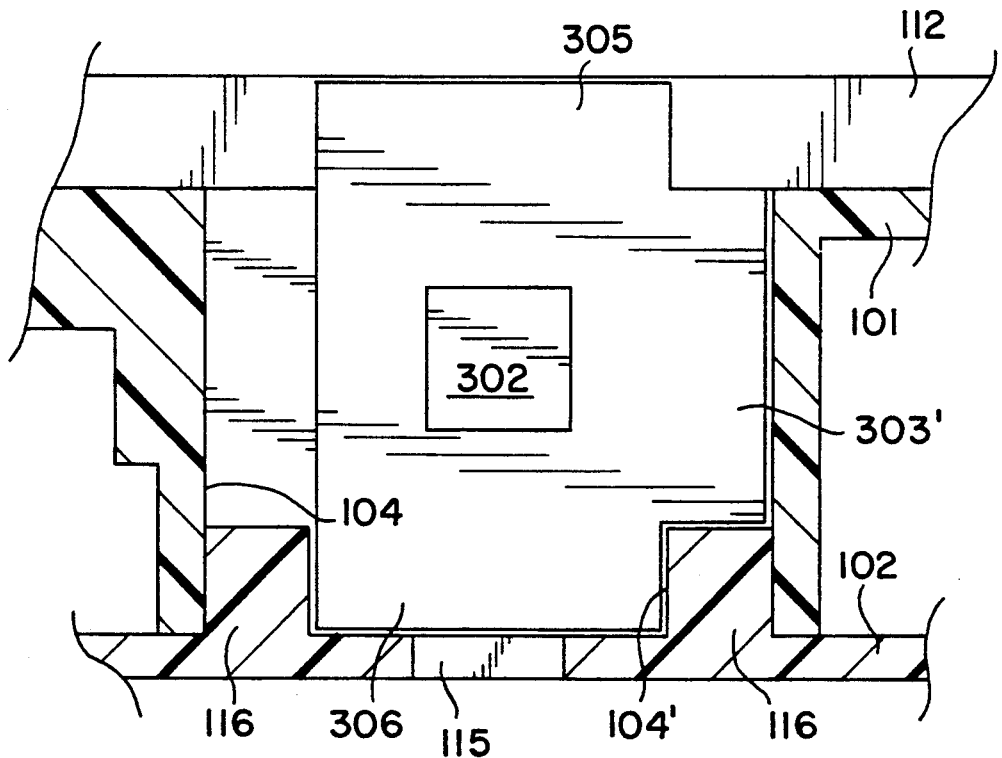

Referring to FIG. 4(B), by rotation of the key element 300 in FIG. 4(A) at 90 degrees about a horizontal axis which is surrounded by the planes M, A, B and S, i.e. loading the key element 300 with the plane A facing up to be the orientation plane, the block 306 and the blade 307 on the plane B are embedded within the cavity 104' of the base 102 and individually sandwiched between the two opposite engagement bars 116 with the lower portions of the blocks 303, 303' on the plane M seated against the top portion of one engagement bar 116. In this situation, the block 304 on the plane A blocks a portion of the channel 112 and the corresponding keyway 312 on the plane A is the only way which allows left side passage.

Figure 4C:
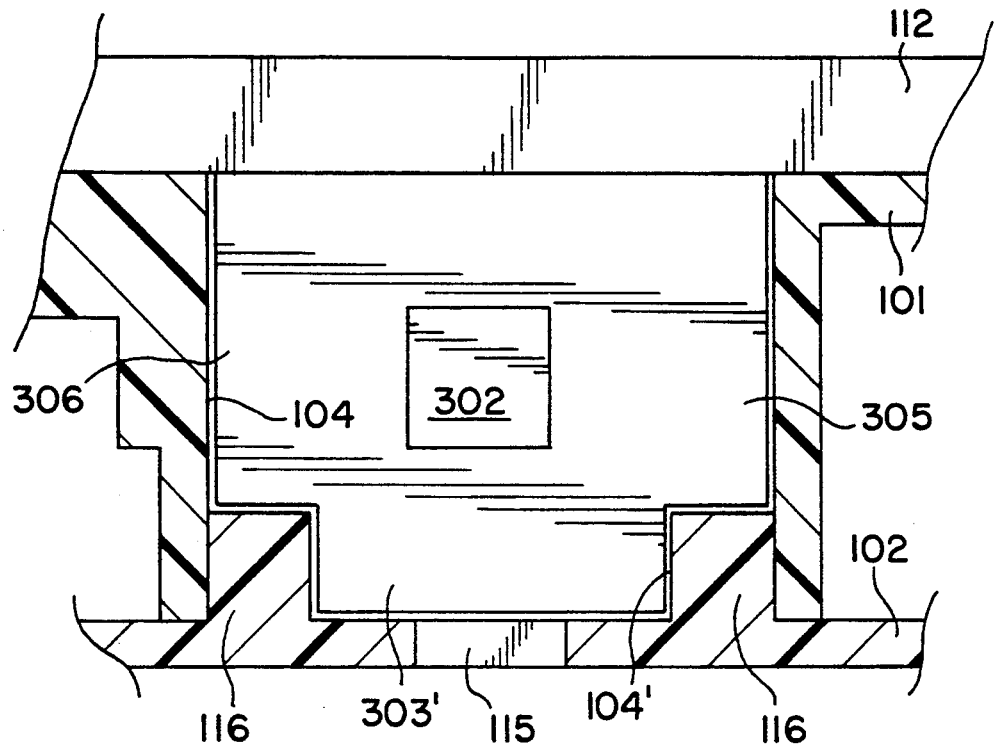

Referring To FIG. 4(C), by further rotation of the key element 300 in FIG. 4(B) at 90 degrees about the horizontal axis, i.e. loading the key element 300 with the plane S facing up to be the orientation plane, the blocks 303 and 303' on the opposite plane M are embedded with the cavity 104' of the base 102 and individually sandwiched between the engagement bars 116 with the block 304 and the blade 305 on the plane A and the block 306 and blade 307 on the plane B abutting against the corresponding engagement bars 116, respectively. In this situation, the plane S is flush with the bottom surface of the channel 112 so that a wider passageway is defined within the channel which can accommodate a wider key projection or other narrower key projection.

Figure 4D:
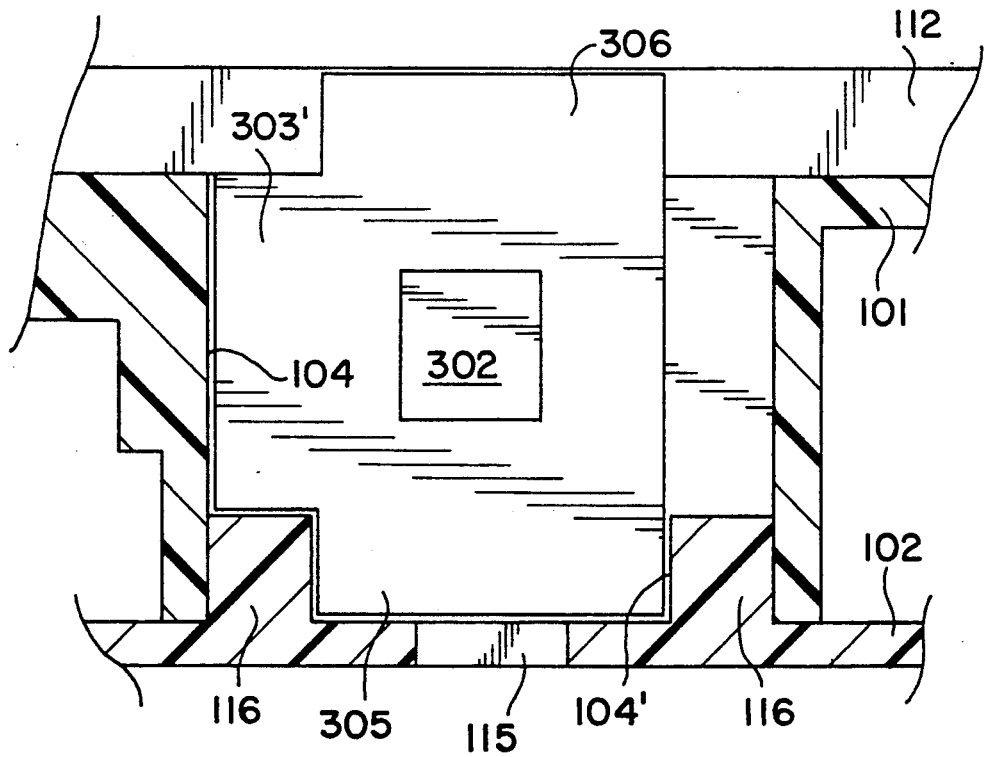

Referring to FIG. 4(D), By further rotation of the key element 300 in FIG. 4(C) or reverse rotation in FIG. 4(A) at 90 degrees, i.e. loading the key element 300 with the plane B facing up to be the orientation plane, the block 304 and the blade 305 on the plane A are embedded within the cavity 104' of the base 102 and individually sandwiched between the engagement bars 116 with the lower portions of he blocks 303, 303' on the plane M seated against the top portion of one engagement bar 116. In this situation, the block 306 on the plane B blocks a portion of the channel 112 and the corresponding keyway 313 on the plane B is the only way which allows right side passage.

In this embodiment, the key element 300 is fixedly received within the aligned combination of the cavities 104 and 104' with an interference fit, especially by the engagement of two opposite side planes 301 with the corresponding walls defining the cavity 104 of the cover 101. Alternatively, an additional structure of an embossment versus a properly positioned and sized recess may be applied to the other side plane which is opposite to the side plane having the polarization section 302 thereon, and its corresponding facing wall 124 of the cover 101, thereby increasing the resistance to severe vibration thereof.

It is appreciated that the blade 305 on the plane A and the blade 307 on the plane B which cooperate with the block 304 on the plane A and the block 306 on the plane B can provide a better stable installation of the key element 300 within the cavities 104 and 104'. However, these blades 305 and 307 can be omitted without effecting the function of the key element 300.

It can be understood that the installation of the key element 300 is independent from the assembling of the connector housing 100, so repositioning the key element 300 within the cavities 104 and 104' will not jeopardize the combination itself of the cover 101 and the base 102 due to inadvertent operation.

It can been seen that changing position of the key element 300 can be simply implemented by using any handy thing having a pin type tip of a proper length, even a sharped pencil or a ballpoint pen, and upwardly inserting the tip into the pin aperture 115 in the base 102 from the bottom to upwardly force on the bottom side of the key element 300 and expel the key element 300 from the cavities 104 and 104'; therefore, this type change is simple, easy and quick.

It is also noted that every orientation plane only indicates one keyway position and only one direction can be applied to the loading of the key element 300 into the cavities 104, 104' due to the polarization section 302 so that it is easy for an operator to quickly reposition the key element 300 with the desired orientation plane facing up and having the required keyway to be mate with. Preferably, each orientation plane can be marked by a letter as A, B, M or S which corresponds to the same letter-marked key projection of a complementary receptacle connector whereby the operator can easily know which plane should face up and successively insert the key element 300 into the cavities 104, 104' in the engagement of the polarization section 302 with the groove 113 of the wall 124 of the cover 101. In contrast, the prior art key element uses one major surface having a symmetrical T-shaped configuration thereon to form three different orientations by rotation about a vertical axis, thus easily having the operator confused and need to spend time to check the position of the key projection of the complementary receptacle connector for determining the right repositioning of the key element in the connector assembly. Additionally, rotation about only one horizontal axis is more easily understandably operated than rotation about a horizontal axis or a vertical axis disclosed in the prior art.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. An optical fiber connector assembly comprising:
   an insulating housing formed from two complementary upper cover and lower base suitably self-locked together;

at least one ferrule receiving trough adapted to receive a ferrule for securing an optical fiber cable to the housing;

a passageway formed within the housing for receiving a hollow retention bolt through which the optical fiber cable enters the housing;

a channel positioned in the housing;

the improvement comprising:

a multi-faceted mode-marking key element provided independently nested in an interference fit in an appropriate recess formed within the housing between the upper cover and the lower base wherein said key element has four different orientation planes surrounding an horizontal axis therein and each orientation plane may have at least one block in an exclusive position defining an exclusive keyway thereon so that by rotation of the key element about the axis, the blocks of the selected orientation plane block a portion of the channel with therein the keyway allowing passage of a desired key projection of a complementary receptacle connector.

2. The optical fiber connector assembly as described in claim 1, wherein the key element further includes a side plane having a polarization section thereon to cooperate with a groove about the recess in the housing for polarization of the key element.

3. The optical fiber connector assembly as described in claim 1, wherein the recess is formed by an upper cavity in the cover and an aligned communicating lower cavity in the base, a pair of opposite engagement bars positioned in the lower cavity to cooperate with the block of the orientation plane at a bottom side of the key element for correctly exposing the opposite operative orientation plane within the channel.

4. The optical fiber connector assembly as described in claim 1, wherein the key element has a parallelepiped shape including said four orientation planes and two side planes, said four orientation planes being composed of two set of two parallel opposite planes of which one set has a fist plane having a pair of parallel raising blocks on two opposite sides and a keyway defined therebetween and a third planes having no raising block thereon, and the other set has a second plane having a large block on a right side with a left side keyway and a fourth plane having a large block on a left side with a right side keyway.

5. The optical fiber connector assembly as described in claim 4, wherein the second plane further comprises a blade opposite to the block thereon thereby to form the left side keyway therebetween, and the fourth plane further comprises a blade opposite to the block thereon thereby to form the right side keyway therebetween.

6. The optical fiber connector assembly as described in claim 3 wherein the upper cavity extends through the cover and the lower cavity generally is closed at the bottom except a pin aperture.

7. An optical fiber connector assembly comprising a housing enclosing a pair of ferrules at a first end for receiving an optical fiber cable therein, a passageway defined at an opposite second end incorporating retention means to fasten said optical fiber cable to the housing, at least one latch of the housing cooperating with one detent within the housing for self-locking the housing, a recess formed within the housing for receiving a multi-faceted mode-marking key element therein wherein said key element has at least three orientation planes positioned around a horizontal axis about which the key element can be repositioned within the recess by rotation, each orientation plane defining a mutually exclusive keyway thereon for receiving a projection key of a complementary receptacle connector, and wherein a pair of opposite engagement bars are positioned at the bottom of the recess for engagement with the key element 8. The optical fiber connector assembly as described in claim 7, wherein said key element further comprises a side plane perpendicular to said horizontal axis, said side plane having a polarization section for engagement with a groove positioned about the recess.

9. A multi-faceted mode-marking key element for reception within an optical fiber connector assembly being of a parallelepiped shape having four orientation planes peripherally enclosing an axis, a first orientation plane having a pair of parallel raising blocks on two opposite sides and a keyway defined therebetween, a second orientation plane having a block on a right side with a left side keyway, a third orientation plane opposite to the first orientation plane having no raising block thereon, and a fourth orientation plane opposite to the second orientation plane having a block on a left side with a right side keyway.

10. The key element described in claim 9, wherein said key element further comprises a side plane perpendicular to the axis, said side plane having a polarization section thereon.

11. The key element described in claim 10, wherein the second plane further comprises a blade opposite to the block thereon thereby to define the left side keyway therebetween, and the fourth plane further comprises a blade opposite to the block thereon thereby to define the right side keyway therebetween.

* * * * *